United States Patent
Kim et al.

(10) Patent No.: US 7,573,711 B2
(45) Date of Patent: Aug. 11, 2009

(54) MONITOR HAVING A MOVING MEMBER COUNTERBALANCING WEIGHT OF DISPLAY

(75) Inventors: Ju-hwan Kim, Suwon (KR); Dae-hyoun Byoun, Seoul (KR); Sang-kyeong Ha, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/889,998

(22) Filed: Aug. 17, 2007

(65) Prior Publication Data

US 2007/0284488 A1 Dec. 13, 2007

Related U.S. Application Data

(62) Division of application No. 10/705,770, filed on Nov. 12, 2003, now Pat. No. 7,274,555.

(30) Foreign Application Priority Data

Nov. 11, 2002 (KR) ................. 2002-69680

(51) Int. Cl.
*G06F 1/16* (2006.01)
(52) U.S. Cl. .............. 361/681; 248/917; 248/919; 248/920; 248/918; 248/125.1; 248/125.2; 248/125.8; 248/157; 248/419; 248/125.3; 361/682
(58) Field of Classification Search ............ 248/917, 248/919, 920, 918, 125.1, 125.2, 125.8, 157, 248/419, 125.3; 361/681, 682
See application file for complete search history.

(56) References Cited

U.S. PATENT DOCUMENTS 2,041,370 A 5/1936 Pottorff
2,042,443 A 5/1936 Buckstone (Continued)

FOREIGN PATENT DOCUMENTS

CN 1031010 C 2/1996

(Continued)

OTHER PUBLICATIONS

U.S. Appl. No. 10/295,831, filed Nov. 18, 2002, Hyun-jun Jung et al., Samsung Electronics Co, Ltd.

(Continued)

*Primary Examiner*—J. Allen Shriver, II
*Assistant Examiner*—Nkeisha J Dumas
(74) *Attorney, Agent, or Firm*—Staas & Halsey LLP

(57) ABSTRACT

A monitor having: a monitor main body displaying a picture; a base member; a stand member standing on the base member; a moving member combined to the stand member to move up and down, that supports the monitor main body with a force counterbalancing a weight of the monitor main body; a locking part provided in the moving member; a locking hook provided on one of the stand member and the base member to be locked to and released from the locking part of the moving member; and an elastic member to release the locking hook from the locking part when the moving member supports monitor main body with the force counterbalancing the weight of the monitor main body. With this configuration, the present invention provides a monitor which has decreased packing volume, and is convenient to handle.

7 Claims, 8 Drawing Sheets

U.S. PATENT DOCUMENTS

| | | |
|---|---|---|
| 2,628,142 A | 2/1953 | Dubach |
| 2,890,010 A | 6/1959 | Barkheimer |
| 3,285,207 A | 11/1966 | Vom Hagen |
| 3,434,684 A | 3/1969 | Warden |
| 3,788,587 A | 1/1974 | Stemmler |
| 4,113,215 A | 9/1978 | Stapleton |
| 4,166,522 A | 9/1979 | Bourcier de Carbon |
| 4,235,405 A | 11/1980 | Carey |
| 4,329,800 A | 5/1982 | Shuman |
| 4,339,104 A | 7/1982 | Weidman |
| 4,395,010 A | 7/1983 | Helgeland et al. |
| 4,438,458 A | 3/1984 | Münscher |
| 4,447,031 A | 5/1984 | Souder, Jr. et al. |
| 4,601,246 A | 7/1986 | Damico |
| 4,616,218 A | 10/1986 | Bailey et al. |
| 4,669,694 A | 6/1987 | Malick |
| 4,690,362 A | 9/1987 | Helgeland |
| 4,691,886 A | 9/1987 | Wedling et al. |
| 4,729,533 A | 3/1988 | Hillary et al. |
| D295,415 S | 4/1988 | Thies et al. |
| 4,768,744 A | 9/1988 | Leeds et al. |
| 4,777,750 A | 10/1988 | Garfinkle |
| 4,834,329 A | 5/1989 | Delapp |
| 4,846,434 A | 7/1989 | Krogsrud |
| 4,859,092 A | 8/1989 | Makita |
| 4,864,601 A | 9/1989 | Berry |
| 4,924,931 A | 5/1990 | Miller |
| D313,405 S | 1/1991 | Barry et al. |
| 4,989,813 A | 2/1991 | Kim et al. |
| 5,012,852 A | 5/1991 | Blackhurst |
| 5,088,676 A | 2/1992 | Orchard et al. |
| 5,102,084 A | 4/1992 | Park |
| 5,107,402 A | 4/1992 | Malgouires |
| 5,112,019 A | 5/1992 | Melzler et al. |
| 5,144,290 A | 9/1992 | Honda et al. |
| 5,163,652 A | 11/1992 | King |
| 5,206,790 A | 4/1993 | Thomas et al. |
| D337,104 S | 7/1993 | Orchard |
| D349,489 S | 8/1994 | Wang |
| 5,335,142 A | 8/1994 | Anderson |
| 5,383,138 A | 1/1995 | Motoyama et al. |
| 5,422,951 A | 6/1995 | Takahashi et al. |
| 5,437,236 A | 8/1995 | Zeiner |
| 5,549,264 A | 8/1996 | West |
| 5,634,537 A | 6/1997 | Thorn |
| 5,751,548 A | 5/1998 | Hall et al. |
| 5,758,849 A | 6/1998 | Bui et al. |
| 5,771,152 A | 6/1998 | Crompton et al. |
| 5,799,917 A | 9/1998 | Li |
| 5,812,368 A | 9/1998 | Chen et al. |
| 5,835,342 A | 11/1998 | Hunte |
| 5,876,008 A | 3/1999 | Sweere et al. |
| 5,894,633 A | 4/1999 | Kaneko |
| 5,911,523 A | 6/1999 | Burchart |
| 5,924,665 A | 7/1999 | Sweere et al. |
| 5,941,493 A | 8/1999 | Cheng |
| 5,975,472 A | 11/1999 | Hung |
| 5,992,809 A | 11/1999 | Sweere et al. |
| 5,997,493 A | 12/1999 | Young |
| 6,012,693 A | 1/2000 | Voeller et al. |
| 6,015,120 A | 1/2000 | Sweere et al. |
| 6,018,847 A | 2/2000 | Lu |
| 6,031,714 A | 2/2000 | Ma |
| 6,062,148 A | 5/2000 | Hodge et al. |
| 6,064,373 A | 5/2000 | Ditzik |
| 6,081,420 A | 6/2000 | Kim et al. |
| 6,113,046 A | 9/2000 | Wang |
| 6,116,690 A | 9/2000 | Larson |
| 6,134,103 A | 10/2000 | Ghanma |
| 6,145,797 A | 11/2000 | Uehara |
| 6,164,611 A | 12/2000 | Kuhnke |
| 6,168,124 B1 | 1/2001 | Matsuoka et al. |
| 6,189,842 B1 | 2/2001 | Bergeron Gull et al. |
| 6,189,849 B1 | 2/2001 | Sweere et al. |
| 6,189,850 B1 | 2/2001 | Liao et al. |
| 6,231,021 B1 | 5/2001 | Hong |
| 6,233,138 B1 | 5/2001 | Osgood |
| 6,270,047 B1 | 8/2001 | Hudson |
| 6,276,655 B1 | 8/2001 | Byoun |
| 6,286,794 B1 | 9/2001 | Harbin |
| 6,288,891 B1 | 9/2001 | Hasegawa et al. |
| 6,305,659 B1 | 10/2001 | Metelski |
| 6,326,955 B1 | 12/2001 | Ditzik |
| 6,347,433 B1 | 2/2002 | Novin et al. |
| 6,352,226 B1 | 3/2002 | Gordon |
| 6,367,756 B1 | 4/2002 | Wang |
| 6,378,830 B1 | 4/2002 | Lu |
| 6,381,125 B1 | 4/2002 | Mizoguchi et al. |
| 6,390,433 B1 | 5/2002 | Kasa-Djukic |
| 6,394,403 B1 | 5/2002 | Hung |
| 6,397,761 B1 | 6/2002 | Moore |
| 6,402,109 B1 | 6/2002 | Dittmer |
| 6,409,134 B1 | 6/2002 | Oddsen, Jr. |
| 6,419,196 B1 | 7/2002 | Sweere et al. |
| 6,430,038 B1 | 8/2002 | Helot et al. |
| 6,478,275 B1 | 11/2002 | Huang |
| 6,494,150 B1 | 12/2002 | Phoenix et al. |
| 6,499,704 B2 | 12/2002 | Oddsen, Jr. |
| 6,502,792 B1 | 1/2003 | Cho et al. |
| 6,517,040 B1 * | 2/2003 | Wen ........................ 248/278.1 |
| 6,522,530 B2 | 2/2003 | Bang |
| 6,532,628 B2 | 3/2003 | Kim |
| 6,585,201 B1 * | 7/2003 | Reed ........................ 248/181.1 |
| 6,592,090 B1 | 7/2003 | Li |
| 6,601,810 B2 | 8/2003 | Lee |
| 6,609,272 B1 | 8/2003 | Lee |
| 6,609,686 B2 | 8/2003 | Malizia |
| 6,672,533 B1 | 1/2004 | Farrow et al. |
| 6,680,843 B2 | 1/2004 | Farrow et al. |
| 6,695,266 B1 | 2/2004 | Tsai |
| 6,695,274 B1 | 2/2004 | Chiu |
| 6,698,063 B2 | 3/2004 | Kim et al. |
| 6,702,238 B1 | 3/2004 | Wang |
| 6,708,940 B2 | 3/2004 | Ligertwood |
| 6,712,321 B1 | 3/2004 | Su et al. |
| D489,370 S | 5/2004 | Jobs et al. |
| 6,766,994 B2 | 7/2004 | Serbinski et al. |
| 6,769,657 B1 | 8/2004 | Huang |
| 6,796,541 B2 | 9/2004 | Lu |
| 6,819,550 B2 | 11/2004 | Jobs et al. |
| 6,822,857 B2 | 11/2004 | Jung et al. |
| 6,837,469 B2 | 1/2005 | Wu et al. |
| 6,857,610 B1 | 2/2005 | Conner et al. |
| 6,874,743 B2 | 4/2005 | Watanabe et al. |
| 6,889,958 B2 | 5/2005 | Hoffend, Jr. |
| 6,905,099 B2 | 6/2005 | Sung |
| 6,954,221 B2 | 10/2005 | Wu |
| 7,055,218 B2 | 6/2006 | Lu et al. |
| 7,168,665 B2 | 1/2007 | Hong et al. |
| 7,177,144 B2 | 2/2007 | Ha et al. |
| 7,195,214 B2 | 3/2007 | Lee et al. |
| 7,237,755 B2 | 7/2007 | Cho et al. |
| 2001/0017761 A1 | 8/2001 | Ditzik |
| 2002/0011544 A1 | 1/2002 | Bosson |
| 2002/0020792 A1 | 2/2002 | Lee |
| 2002/0130981 A1 | 9/2002 | Ma et al. |
| 2003/0075649 A1 | 4/2003 | Jeong et al. |
| 2003/0075653 A1 | 4/2003 | Li |
| 2003/0080949 A1 | 5/2003 | Ditzik |
| 2003/0086240 A1 | 5/2003 | Jobs et al. |
| 2003/0132360 A1 | 7/2003 | Ju |
| 2003/0142474 A1 | 7/2003 | Karidis et al. |
| 2004/0011932 A1 | 1/2004 | Duff |
| 2004/0056161 A1 | 3/2004 | Ishizaki et al. |

| | | |
|---|---|---|
| 2004/0057197 A1 | 3/2004 | Hill et al. |
| 2004/0084585 A1 | 5/2004 | Watanabe et al. |
| 2004/0084588 A1 | 5/2004 | Liu et al. |
| 2004/0118984 A1 | 6/2004 | Kim et al. |
| 2006/0219849 A1 | 10/2006 | Chiu |

FOREIGN PATENT DOCUMENTS

| | | |
|---|---|---|
| CN | 2504675 | 8/2002 |
| DE | 2847135 | 5/1980 |
| DE | 39 43 137 A1 | 8/1991 |
| DE | 200 09 691 | 11/2000 |
| DE | 4214341 A1 | 7/2003 |
| EP | 0 046 225 | 2/1982 |
| EP | 244 566 | 11/1987 |
| EP | 631 174 B1 | 4/1998 |
| EP | 1085753 | 3/2001 |
| GB | 2 206 464 | 1/1989 |
| JP | 57-151990 | 9/1982 |
| JP | 61-99873 | 5/1986 |
| JP | 61-99874 | 5/1986 |
| JP | 61-196314 | 8/1986 |
| JP | 62-96681 | 5/1987 |
| JP | 62-96682 | 6/1987 |
| JP | 62-239677 | 10/1987 |
| JP | 1-273086 | 10/1989 |
| JP | 2-58783 | 4/1990 |
| JP | 2-215408 | 8/1990 |
| JP | 03-2381 | 1/1991 |
| JP | 3-29800 | 3/1991 |
| JP | 3-095586 | 4/1991 |
| JP | 3-113423 | 11/1991 |
| JP | 3-114875 | 11/1991 |
| JP | 4-15680 | 1/1992 |
| JP | 4-33073 | 3/1992 |
| JP | 4-81182 | 3/1992 |
| JP | 4-107284 | 4/1992 |
| JP | 4-155375 | 5/1992 |
| JP | 4-198979 | 7/1992 |
| JP | 3-017022 | 9/1992 |
| JP | 4-132517 | 12/1992 |
| JP | 5-36523 | 2/1993 |
| JP | 5-097098 | 4/1993 |
| JP | 5-36423 | 5/1993 |
| JP | 5-188865 | 7/1993 |
| JP | 05-66715 | 9/1993 |
| JP | 64778 | 1/1994 |
| JP | 6-37912 | 2/1994 |
| JP | 6-21079 | 3/1994 |
| JP | 6-118880 | 4/1994 |
| JP | 8-121009 | 5/1996 |
| JP | 8-234672 | 9/1996 |
| JP | 8-319753 | 12/1996 |
| JP | 10-126068 | 5/1998 |
| JP | 10-214034 | 8/1998 |
| JP | 10-228333 | 8/1998 |
| JP | 11-006520 | 1/1999 |
| JP | 11-095866 | 4/1999 |
| JP | 11-154460 | 6/1999 |
| JP | 11-214859 | 8/1999 |
| JP | 11-338576 | 12/1999 |
| JP | 2000-019981 | 1/2000 |
| JP | 2000-56695 | 2/2000 |
| JP | 3068198 | 2/2000 |
| JP | 2000-122561 | 4/2000 |
| JP | 2000-206893 | 7/2000 |
| JP | 2000-206901 | 7/2000 |
| JP | 2000-242363 | 9/2000 |
| JP | 3073553 | 9/2000 |
| JP | 2000267581 | 9/2000 |
| JP | 2001-50244 | 2/2001 |
| JP | 2001-142407 | 5/2001 |
| JP | 2001-202026 | 7/2001 |
| JP | 2001-241427 | 9/2001 |
| JP | 20026990 | 1/2002 |
| KR | 1989-3755 | 6/1989 |
| KR | 88-3444 | 10/1989 |
| KR | 1989-20328 | 10/1989 |
| KR | 1991-0009310 | 5/1991 |
| KR | 114350 | 11/1997 |
| KR | 1997-63717 | 12/1997 |
| KR | 1998-4698 | 3/1998 |
| KR | 163133 | 9/1998 |
| KR | 1998-54989 | 12/1998 |
| KR | 1999-40596 | 6/1999 |
| KR | 1999-0040596 | 6/1999 |
| KR | 1999-0073869 | 10/1999 |
| KR | 20-168389 | 11/1999 |
| KR | 2000-722 | 1/2000 |
| KR | 2000-725 | 1/2000 |
| KR | 2000-827 | 1/2000 |
| KR | 20-182808 | 3/2000 |
| KR | 20-184275 | 3/2000 |
| KR | 20-0178710 | 4/2000 |
| KR | 20-0191805 | 8/2000 |
| KR | 20-215332 | 12/2000 |
| KR | 2000-73608 | 12/2000 |
| KR | 2000-0074849 | 12/2000 |
| KR | 10-0289438 | 2/2001 |
| KR | 2002-5136 | 2/2001 |
| KR | 20-227925 | 4/2001 |
| KR | 20-227953 | 4/2001 |
| KR | 2001-0035722 | 5/2001 |
| KR | 2001-35722 | 5/2001 |
| KR | 20-0227925 | 6/2001 |
| KR | 20-239991 | 7/2001 |
| KR | 2001-53963 | 7/2001 |
| KR | 2001-56960 | 7/2001 |
| KR | 2001-83865 | 9/2001 |
| KR | 20-251611 | 10/2001 |
| KR | 20-0253576 | 11/2001 |
| KR | 20-0256013 | 11/2001 |
| KR | 20-256809 | 11/2001 |
| KR | 20-259625 | 12/2001 |
| KR | 20002-5136 | 1/2002 |
| KR | 2002-0029616 | 4/2002 |
| KR | 20-0279427 | 6/2002 |
| KR | 20-279427 | 6/2002 |
| KR | 10-353035 | 9/2002 |
| KR | 20-295990 | 11/2002 |
| KR | 20-304340 | 2/2003 |
| KR | 2003-0058204 | 7/2003 |

OTHER PUBLICATIONS

U.S. Appl. No. 10/314,350, filed Dec. 1, 2002, Sang-kyeong Ha et al., Samsung Electronics Co. Ltd.
U.S. Appl. No. 10/646,864, filed Apr. 1, 2003, You-Sik Hong et al., Samsung Electronics Co. Ltd.
U.S. Appl. No. 10/671,605, filed Sep. 1, 2003, Jun-soo Jeong, Samsung Electronics Co. Ltd.
U.S. Appl. No. 10/671,863, filed Sep. 1, 2003, Ju-hwan Kim et al., Samsung Electronics Co. Ltd.
U.S. Appl. No. 10/694,029, filed Oct. 1, 2003, Nam-il Cho et al., Samsung Electronics Co. Ltd.
U.S. Appl. No. 10/694,041, filed Oct. 1, 2003, You-Sub Lee et al., Samsung Electronics Co. Ltd.
U.S. Appl. No. 10/705,770, filed Nov. 1, 2003, Ju-hwan Kim et al., Samsung Electronics Co. Ltd.
U.S. Appl. No. 10/792,745, filed Mar. 1, 2004, Sang-kyeong Ha et al., Samsung Electronics Co. Ltd.
U.S. Appl. No. 10/916,436, filed Aug. 12, 2004, Hyun-jun Jung et al., Samsung Electronics Co. Ltd.
U.S. Appl. No. 10/916,447, filed Aug. 12, 2004, Hyun-jun Jung et al., Samsung Electronics Co, Ltd.

U.S. Appl. No. 10/406,269, filed Apr. 4, 2003, You-sik Hong, et al., Samsung Electronics Co, Ltd.
Vesa Mounting Interface Standard, Mar. 19, 2003, 2 pages, www.ergotron.com/2_Product_pages/FP_ARMS/VESA/fp_vesa.asp.
Third Party Submission document filed Aug. 27, 2004 in Korean Industrial Property Office, issued Sep. 22, 2004.
Chinese Office Action of Application No. 03110326.X issued Sep. 24, 2004.
Chinese Office Action of Application No. 03154931.4 issued Sep. 9, 2005.
Singapore Office Action issued on May 13, 2005.
Korean Office Action issued on Jul. 26, 2004.
Japanese Office Action mailed Sep. 21, 2004 in JP 2002-333914.
Japanese Office Action mailed Jun. 14, 2005 in JP 2002-333914.
Korean Office Action issued on Mar. 16, 2005.
Korean Office Action issued on Aug. 20, 2004.
SIPO Office Action issued on Sep. 9, 2005.
U.S. Patent No. 6,822,857.
Korean Office Action issued on Mar. 8, 2006 in Korean Patent Application No. 10-2002-0050351 which corresponds to co-pending U.S. Appl. No. 10/646,684.
U.S. Patent 7,274,555 to Kim et al.
Japanese Office Action dated Jun. 25, 2007 in Japanese Patent Application No. 2005-360909.
Japanese Office Action dated Jun. 25, 2007 in Japanese Patent Application No. 2005-360911.
Japanese Office Action dated Jun. 25, 2007 in Japanese Patent Application No. 2005-360915.
Korean Patent Office Action, mailed Oct. 19, 2007 and issued in corresponding Korean Patent Application No. Oct. 10-2002-0069680.

* cited by examiner

MONITOR HAVING A MOVING MEMBER COUNTERBALANCING WEIGHT OF DISPLAY

CROSS-REFERENCE TO RELATED APPLICATIONS

This application is a divisional of prior application Ser. No. 10/705,770, filed Nov. 12, 2003 now U.S. Pat. No. 7,274,555 in the U.S. Patent and Trademark Office, the disclosure of which is incorporated herein by reference. This application claims the priority benefit of prior application Ser. No. 10/705,770. This application claims the priority benefit of Korean Patent Application No. 2002-69680, filed Nov. 11, 2002, in the Korean Intellectual Property Office, the disclosure of which is incorporated herein by reference.

BACKGROUND OF THE INVENTION

1. Field of the Invention

The present invention relates to a monitor, and more particularly, to a monitor having a monitor main body displaying a picture, and a base member supporting the monitor main body.

2. Description of the Related Art

Recently, as a computer system is widely used, demand for a monitor is rapidly increased. With this, there have been proposed various monitors having functions to suit user's taste and to give a user convenience.

For example, there is a monitor disclosed in Korean utility model No. 20-279427, which has a base, a stand standing on the base, a plate combined to a rear bracket of the monitor that extends downward, a guide plate combined to the stand and provided with a pair of rail grooves, a slider with a projection to engage the rail groove that slides up and down along the guide plate, a pusher combined to a lower part of the slider having a receipt groove of semicircular cross section in a lower end thereof, and a rolled spring in a rolled state, having a first end coupled to the stand and a second end inserted in the receipt groove of the pusher, and exerting an elastic force in a direction opposite to the weight of a monitor main body.

With this configuration, the conventional monitor operates as follows. When a user wants to adjust the height of the monitor main body to a lower position, the user presses the monitor main body downward, and the monitor main body moves downward, overcoming the elasticity of the rolled spring. Then, when the user stops pressing the monitor main body at the lower position, the monitor main body stops moving, and the weight of the monitor main body is balanced by the elastic force of the rolled spring.

As described above, in the conventional monitor, the monitor main body can be stopped at the lower position because the weight of the monitor main body and the elastic force of the rolled spring balance each other. Therefore, when packing the conventional monitor, if the monitor is separated into the monitor main body and the stand, the slider connected to the rolled spring slides upward, since the weight of the monitor main body counterbalancing the elasticity of the rolled spring is not present.

The volume the monitor occupies is minimized when the slider is positioned at the lowest position, even when the monitor main body is separated from the monitor. In the conventional monitor, however, the slider slides toward the highest position when the monitor main body is separated from the monitor, and thus the volume required to pack the monitor is increased.

Further, when carrying the conventional monitor, if the monitor leans to one side, a vector magnitude of the elastic force of the rolled spring is larger than a vector magnitude of the weight of the monitor main body in the sliding direction of the slider, and thus the elastic force of the rolled spring overcomes the weight of the monitor main body and moves the monitor main body upward. Therefore, when the monitor leans to one side, because the monitor main body suddenly moves upward, it may be inconvenient to handle the monitor.

SUMMARY OF THE INVENTION

Accordingly, it is an aspect of the present invention to provide a monitor which has a decreased packing volume, and is convenient to handle.

Additional aspects and advantages of the invention will be set forth in part in the description which follows and, in part, will be obvious form the description, or may be learned by practice of the invention.

These and/or other aspects of the present invention are achieved by providing a monitor having: a monitor main body displaying a picture; a base member; a stand member standing on the base member; a moving member combined to the stand member to move up and down, that supports the monitor main body with a first force counterbalancing a weight of the monitor main body; a locking part provided on the moving member; a locking hook provided on one of the stand member and the base member, to be locked to and released from the locking part of the moving member; and an elastic member to release the locking hook from the locking part in accordance with a second force on the moving member.

According to an aspect of the invention, the elastic member is a flat spring provided inside the locking part.

According to an aspect of the invention, the monitor also has a moving block combined to the moving member, and a locking block combined to one of the stand member and the base member, wherein the locking part is provided on the moving block, and the locking hook is provided on the locking block.

According to an aspect of the invention, the locking hook protrudes from the locking block, and the locking part has a locking groove corresponding to the locking hook.

According to an aspect of the invention, the monitor also has a base bracket provided between the stand member and the base member, wherein the base bracket is combined with the stand member and the base member, and the locking block is combined to the base bracket.

According to an aspect of the invention, the locking block has a push button protruding through a first side of the base bracket, and a combining projection combined in a second side of the base bracket.

According to an aspect of the invention, the monitor also has a coil spring provided between the locking block and the second side of the base bracket to elastically bias the locking block toward the first side of the base bracket.

According to an aspect of the invention, the coil spring is installed on the combining projection.

BRIEF DESCRIPTION OF THE DRAWINGS

These and/or other aspects and advantages of the invention will become apparent and more readily appreciated from the following description of the preferred embodiments, taken in conjunction with the accompanying drawings in which.

DETAILED DESCRIPTION

Figure 1:
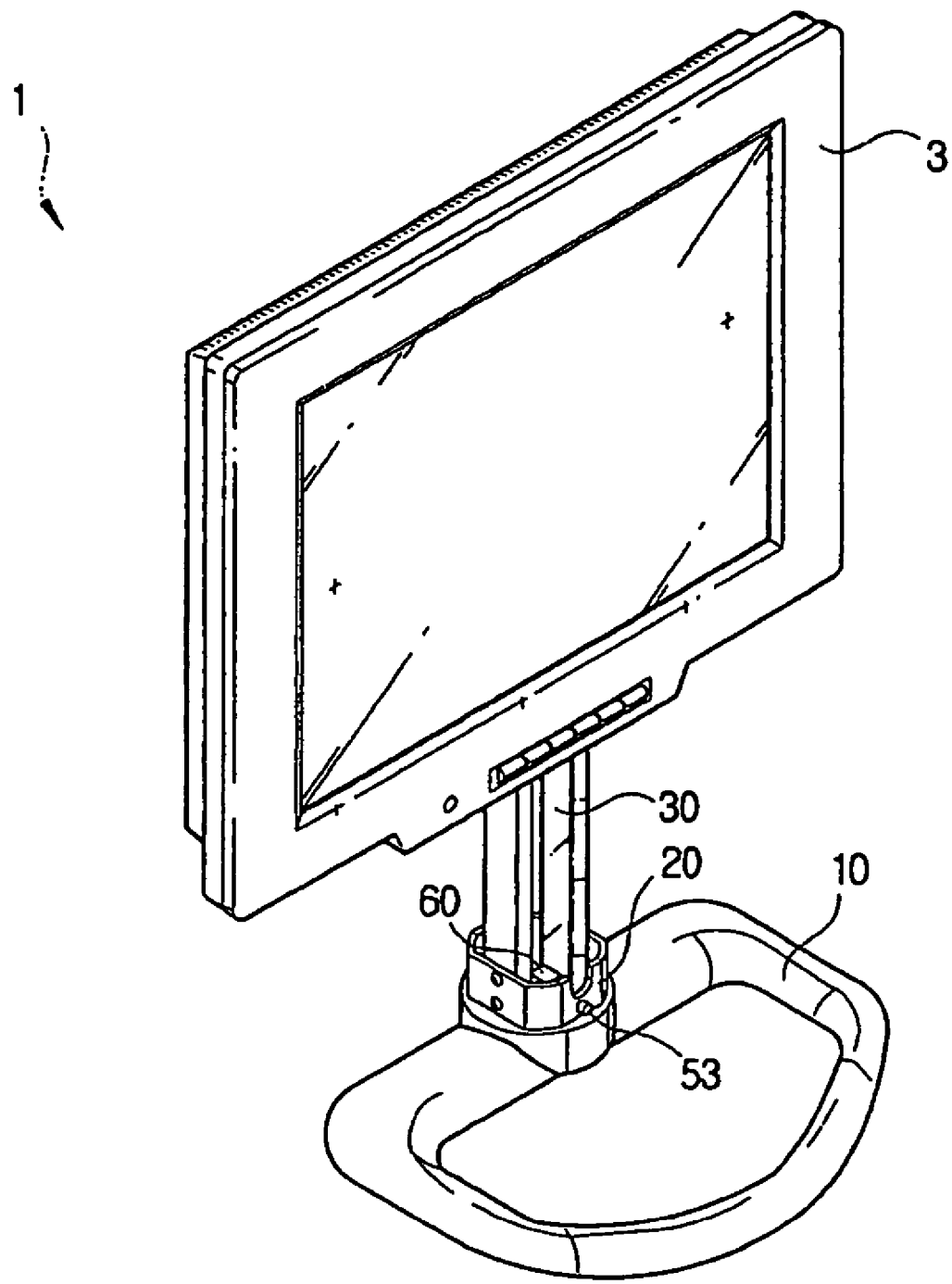
FIG. 1 is a perspective view of a monitor according to the present invention.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

Figure 2:
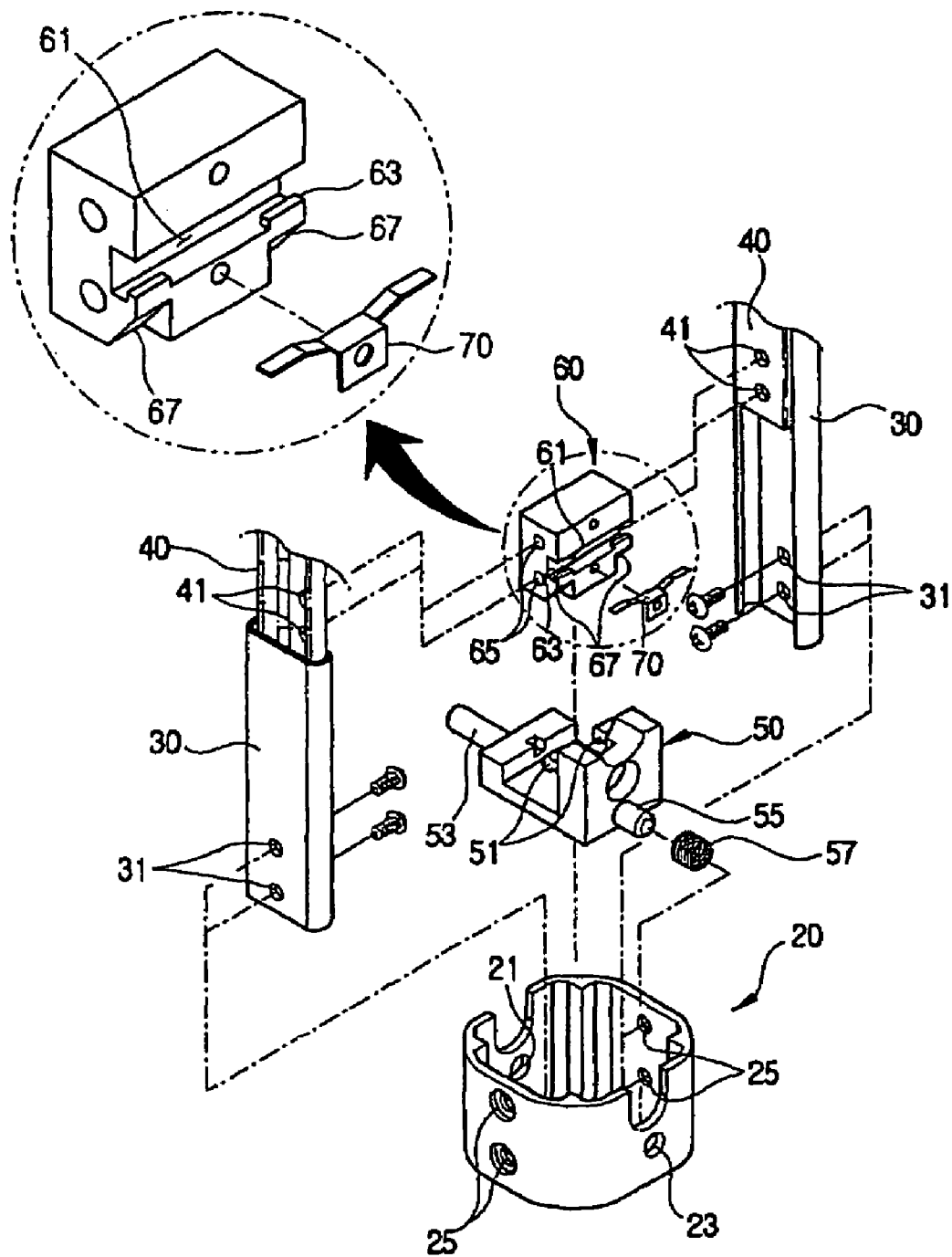
FIG. 2 is a partially exploded perspective view of the monitor of FIG. 1.

As shown in FIGS. 1 and 2, a monitor 1 according to the present invention has a monitor main body 3 displaying a picture (an image), a base member 10 laid on an installation plane 80 (see FIGS. 3A-5) such as a table, to support the monitor main body 3, a stand member 30 standing on the base member 10, a moving member 40 movably combined (connected) to the stand member 30 to move up and down and supporting the monitor main body 3 with a force counterbalancing the weight of the monitor main body 3, a moving block 60 combined (connected) to the moving member 40 and having a locking part 61, a base bracket 20 provided between the stand member 30 and the base member 10, and a locking block 50 combined (connected) to the base bracket 20. Hereinafter, "combined" is used interchangeably with "connected."

According to one aspect, there are a pair of stand members 30, and each stand member 30 is inwardly recessed and accommodates the moving member 40 therein to allow the moving member 40 to move up and down, and thereby guide the moving member 40. Further, a lower part of each stand member 30 has a plurality of bracket combining holes 31 spaced from each other, through which screws pass and fasten to the inside of the base bracket 20.

Similarly, according to one aspect there are a pair of moving members 40, and each moving member 40 is inserted in the respective stand member 30, and moves up and down. Further, an upper part of the moving member 40 is combined to the monitor main body 3 and supports the monitor main body 3 with the force counterbalancing the weight of the monitor main body 3. According to one aspect, the force counterbalancing the weight of the monitor main body 3 is caused by a spring member or first forcing member (see, e.g., FIG. 6) provided between the stand member 30 and the moving member 40.

According to one aspect, the spring member has an upper end coupled to an upper part of the stand member 30 and a lower end coupled to a lower part of the moving member 40. The spring member is used to move the monitor main body 3 upward with the force counterbalancing the weight of the monitor main body 3. According to one aspect, the spring member is a spiral spring. But other devices to apply force can be used, for example, an extension spring, or a gas cylinder.

Figure 6:
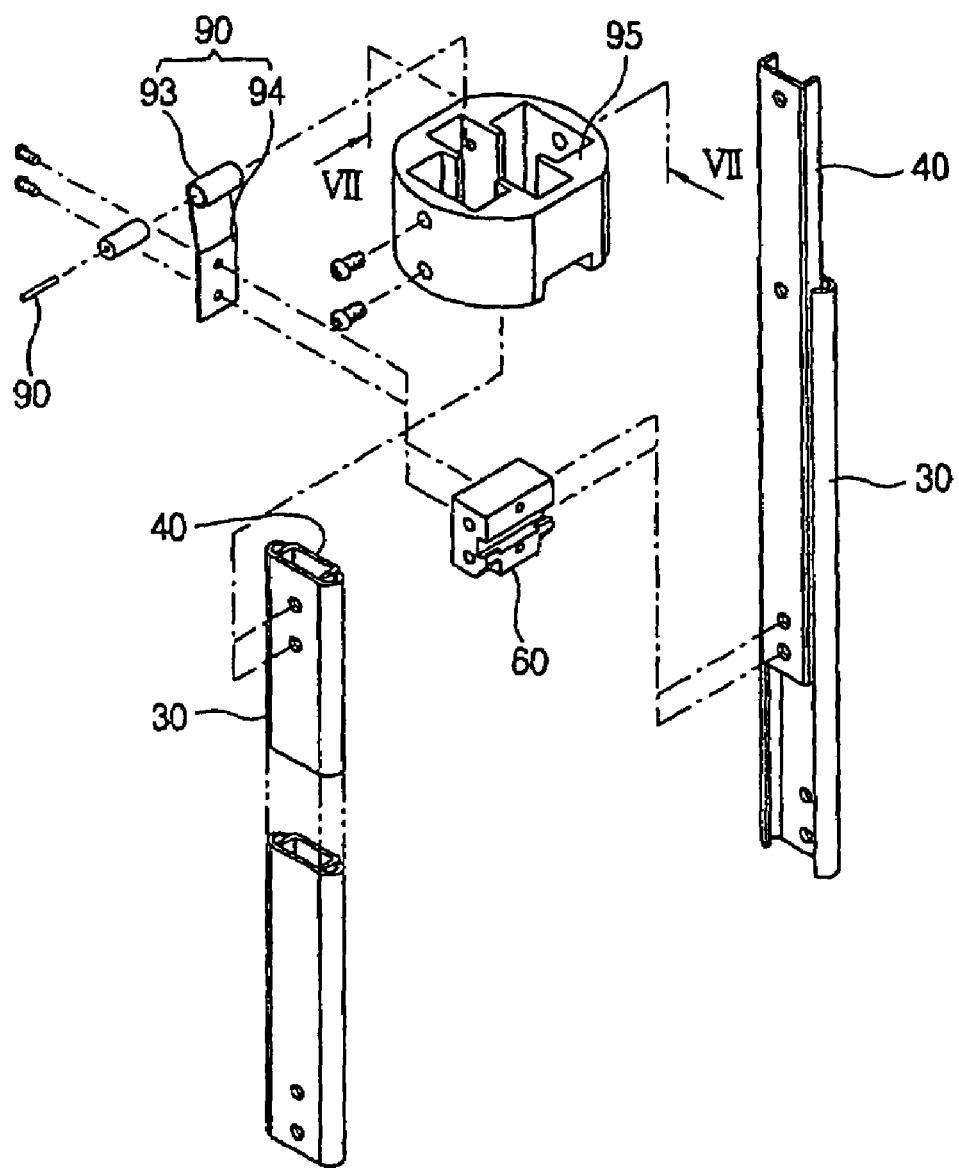
FIG. 6 is a partially exploded perspective view of the monitor of FIG. 1, showing a spring member.
Figure 7:
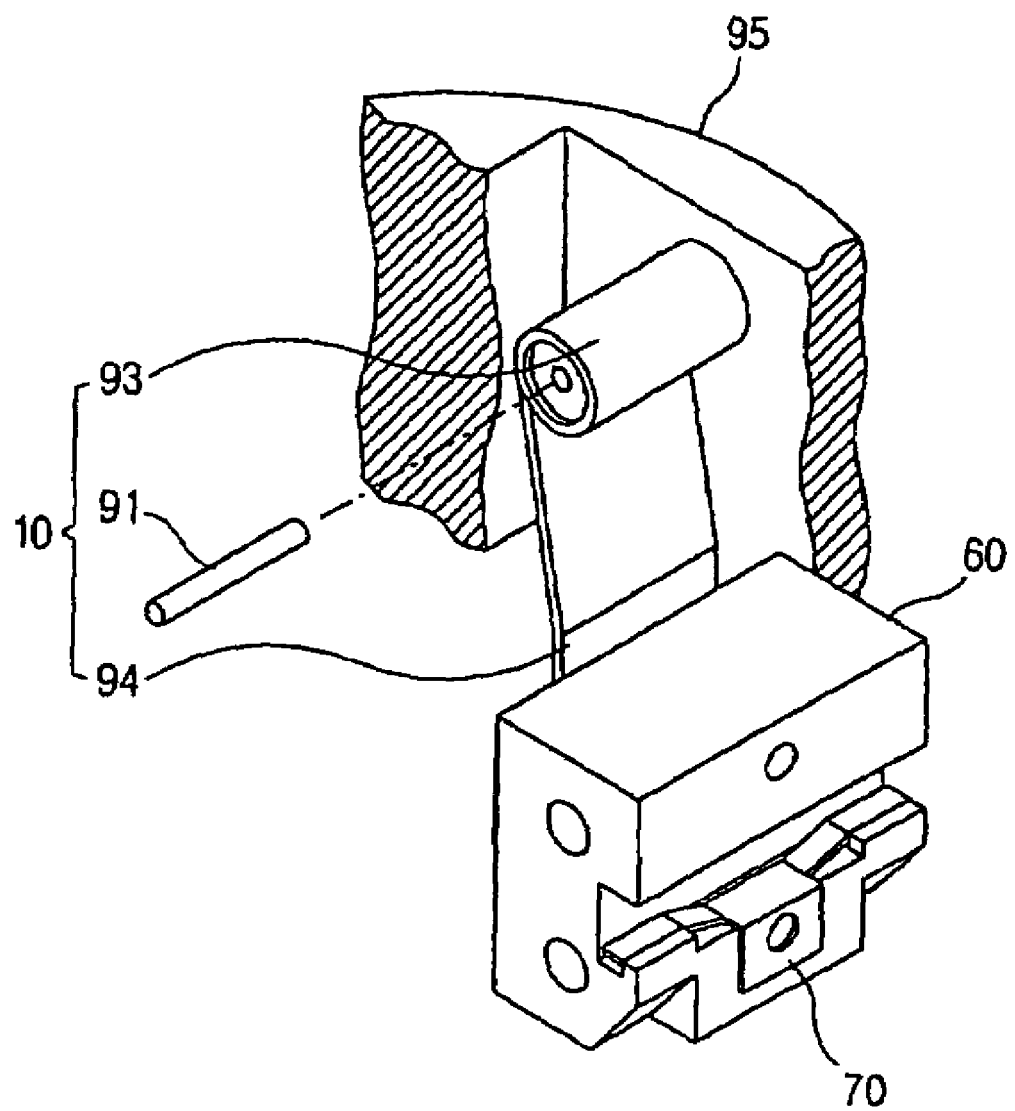
FIG. 7 is a view illustrating how a spiral spring connects to and interoperates with a guiding bracket, a guiding shaft, and a moving block.

The spring member is preferably a spiral spring 90. As shown in FIG. 6, the spiral spring 90 has a first end 93 spirally wound on a guiding shaft 91 and coupled to a guiding bracket 95, and a second end 94 coupled to the moving block 60. Here, the guiding bracket 95 is preferably combined to an upper part of the stand member 30. In other words, the first end of the spiral spring 90 is coupled to the upper side of the stand 30, and the second end of the spiral spring 90 is coupled to the moving block 60, which is coupled to the moving member 40.

To adjust the height of the monitor main body 3, a user presses the monitor main body 3 upward or downward, and stops pressing the monitor main body 3 at a desired position. The monitor main body 3 stops moving because of the balance between the weight of the monitor main body 3 and the elasticity of the spring member.

The base bracket 20 is provided between the stand members 30 and the base member 10, to combine the stand members 30 with the base member 10, thereby firmly supporting the stand members 30 on the base member 10. Inside the base bracket 20 there is a space of predetermined volume to accommodate the locking block 50 therein. Additionally, there are stand combining holes 25 to combine the pair of stand members 30 with the base bracket 20. Further, on a first side of the base bracket 20 there is a button through hole 21, through which a push button 53 of the locking block 50 (to be described later) passes, and on a second side of the base bracket 20 there is a projection through hole 23, through which a combining projection 55 of the locking block 50 passes.

The moving block 60 has moving member combining holes 65 combined by a screw to moving block combining holes 41 provided in a lower part of the moving member 40. The moving block 60 also has the locking part 61, which is concave to accommodate a locking hook 51 of the locking block 50 therein, and a slant part 67 formed in a lower part of the locking part 61 and that slopes at a predetermined angle.

The locking part 61 has a locking groove 63 to which the locking hook 51 of the locking block 50 hooks. Inside the locking groove 63 is provided an elastic member 70 (or third forcing member) to release the locking hook 51 from the locking groove 63 of the locking part 61 when the moving member 40 supports the monitor main body 3 with the force of the spring member counterbalancing the weight of the monitor main body 3.

When the moving member 40 moves downward, the slant part 67 contacts and pushes the locking hook 51 in a direction opposite to a protruding direction of the locking hook 51.

According to one aspect, the elastic member 70 is a flat spring 70 inserted inside the locking groove 63 and fastened to the moving block 60.

The flat spring 70 has an elasticity of predetermined magnitude that is less than the elasticity of the spring member, but sufficient to release the locking hook 51 from the locking groove 63 of the locking part 61 when the monitor main body 3 is supported by the moving member 40 with the force of the spring member counterbalancing the weight of the monitor main body 3.

When the monitor 1 is seated on the installation plane 80 such as a table, the flat spring 70 prevents the locking hook 51 from hooking the locking groove 63.

The locking block 50 has: the locking hook 51, that locks to the locking part 61 of the moving block 60; the push button 53, protruding from the first side of the base bracket 20 through the button through hole 21; and the combining projection 55, inserted in the projection through hole 23 to combine to the second side of the base bracket 20.

The locking hook 51 protrudes from the locking block 50 to hook to the locking groove 63 of the locking part 61, and an end of the locking hook 51 is downwardly bent. According to one aspect, the locking hook 51 is a pair of locking hooks 51, but may be a single, or may be three or more.

The push button 53 protrudes outwardly from the base bracket 20 and slides through the button through hole 21, allowing a user to push the push button 53.

The combining projection 55 is slidingly combined to the base bracket 20, being inserted in the projection through hole 23. A coil spring 57 (or second forcing member) is located on the combining projection 55 between the projection through hole 23 of the base bracket 20 and the locking block 50, to elastically bias the locking block 50 toward the first side of the base bracket 20. According to one aspect, the coil spring 57 is put on the combining projection 55, but the coil spring 57 may be provided anywhere to bias the locking block 50 toward the first side of the base bracket 20.

When a user pushes the push button 53 with a force strong enough to overcome elasticity of the coil spring 57, the locking block 50 moves towards the second side of the base bracket 20. Conversely, when a user removes the force pushing the push button 53, the locking block 50 is returned to an original position by the elasticity of the coil spring 57.

With the above-noted configuration, the locking hook 51 of the monitor 1 according to the present invention locks to the locking part 61 as follows.

Figure 3A:
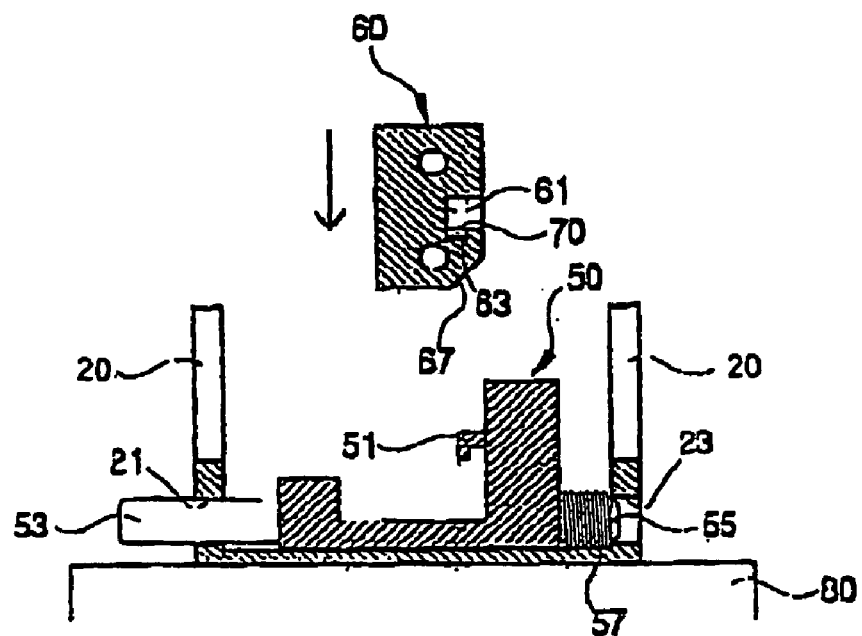
FIGS. 3A through 3D are sectional views illustrating that a locking hook is locked to a locking part of FIG. 2.
Figure 3B:
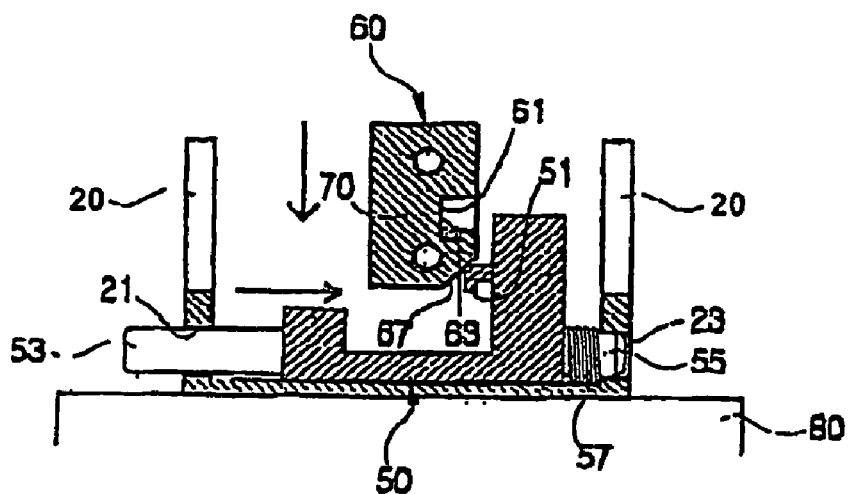
Figure 3C:
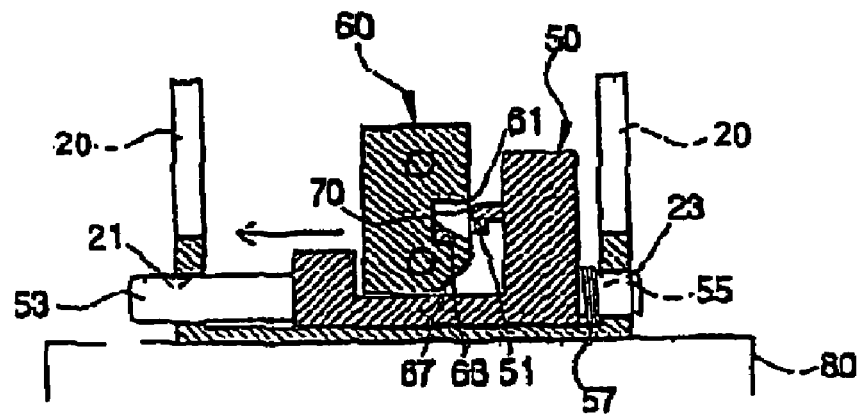
Figure 3D:
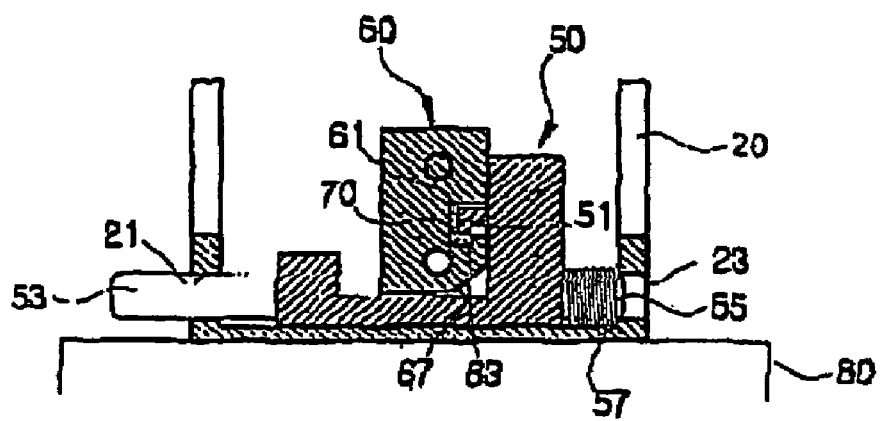

As shown in FIGS. 3A through 3D, when the moving block 60 moves downward as a user presses the monitor main body 3 downward (refer to FIG. 3A), the slant part 67 of the moving block 60 contacts and pushes the locking block 50 toward the second side of the base bracket 20, overcoming the elasticity of the coil spring 57 (refer to FIG. 3B). Then, when the locking hook 51 is adjacent to the locking part 61 (refer to FIG. 3C), the locking hook 51 is inserted in the locking part 61 by the elasticity of the coil spring 57. At this time, although the locking hook 51 of the locking block 50 is inserted in the locking part 61 of the moving block 60, the locking hook 51 is not hooked to the locking groove 63 because of the elasticity of the flat spring 70 provided inside the locking hook 63 (refer to FIG. 3D).

As described above, the reason why the locking hook 51 is not hooked to the locking groove 63 is that the elasticity of the flat spring 70 is less than the elasticity of the spring member, but is sufficient to release the locking hook 51 from the locking groove 63 of the locking part 61 when monitor main body 3 is supported by the moving member 40 with the force of the spring member counterbalancing the weight of the monitor main body 3.

When the monitor 1 is seated on the installation plane 80, such as a table, the locking hook 51 is inserted in the locking part 61 of the moving block 60 but is not hooked to the locking groove 63 of the locking part 61, and thus, a user can easily move the monitor main body 3 upward after removing the locking hook 51 from the locking part 61 by pushing the push button 53.

Figure 4:
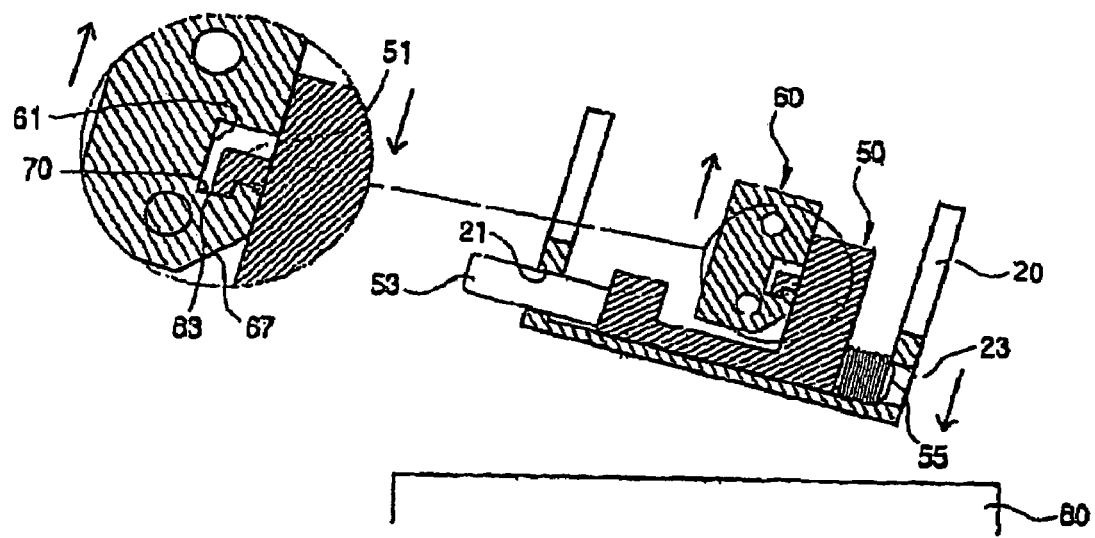
FIG. 4 is a sectional view illustrating the locking hook locked to the locking part of FIG. 2 in the state that the monitor main body is separated from the monitor.

As shown in FIG. 4, however, when the monitor 1 leans to one side, for example, if a user carries the monitor 1, a magnitude of a vector of the elasticity of the spring member is greater than a magnitude of a vector of the weight of the monitor main body 3 in the moving direction of the moving block 60. Therefore, the elasticity of the spring member overcomes the weight of the monitor main body 3, thereby moving the monitor main body 3 upward. Then, the locking hook 51 is hooked to the locking groove 63 by the elasticity of the spring member, pressing the flat spring 70 provided in the locking groove 63. If a user pushes the push button 53 by mistake, the push button 53 does not slide, because the locking hook 51 is hooked to the locking groove 63. Thus, the monitor main body 3 is prevented from suddenly moving upward and it is convenient to handle the monitor 1.

Figure 5:
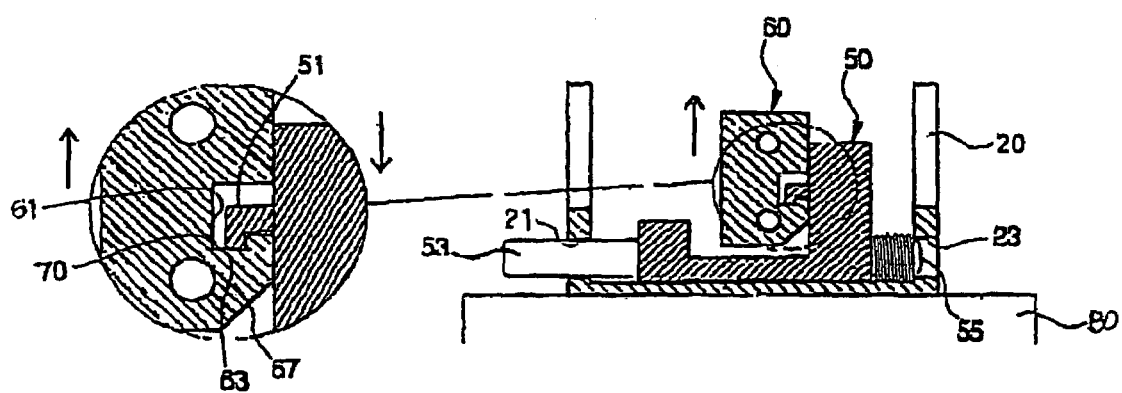
FIG. 5 is a sectional view illustrating the locking hook locked to the locking part of FIG. 2 in the state that the monitor main body leans to one side.

Further, as shown in FIG. 5, when the monitor main body 3 is separated from the monitor 1 for example, to pack the monitor 1, the locking hook 51 is hooked to the locking groove 63 by the elasticity of the spring member, pressing the flat spring 70 provided in the locking groove 63 because the weight of the monitor main body 3 counterbalancing the elasticity of the spring member is not present. If a user pushes the push button 53 by mistake, the push button 53 does not slide, because the locking hook 51 is hooked to the locking groove 63. Thus, the monitor 1 can be safely packed with the minimum volume, thereby decreasing the packing volume.

As described above, the present invention provides a monitor which is decreased in packing volume and is convenient to carry, handle, etc.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A monitor, including a monitor main body displaying an image, and a base member supporting the monitor main body, the monitor comprising:
   a stand member standing on the base member;
   a moving member, combined to the stand member, wherein the moving member moves up and down and supports the monitor main body with a first forcing member to counterbalance a weight of the monitor main body;
   a locking part provided in the moving member;
   a locking hook provided on one of the stand member or the base member to lock to and be released from the locking part of the moving member;
   an elastic member to release the locking hook from the locking part when the first forcing member counterbalances the weight of the monitor main body;
   a moving block combined to the moving member; and
   a locking block combined to at least one of the stand member or the base member,
   wherein the locking part is provided on the moving block, and the locking hook is provided on the locking block.

2. The monitor according to claim 1, wherein:
   the locking hook protrudes from the locking block; and
   the locking part has a locking groove corresponding to the locking hook.

3. The monitor according to claim 2, further comprising:
   a base bracket provided between the stand member and the base member,
   wherein the base bracket is connected with the stand member and the base member, and the locking block is connected to the base bracket.

4. The monitor according to claim 3, wherein the locking block comprises:
   a push button protruding through a first side of the base bracket; and
   a combining projection protruding through a second side of the base bracket.

5. The monitor according to claim 4, further comprising:
   a coil spring provided between the locking block and the second side of the base bracket to elastically bias the locking block toward the first side of the base bracket.

6. The monitor according to claim 5, wherein the coil spring is installed on the combining projection.

7. The monitor according to claim 1, wherein the elastic member comprises a flat spring provided inside the locking part.

* * * * *